July 4, 1939. J. M. CHRISTMAN 2,164,569
METHOD OF LOCATING THE TEETH OF ROTARY CUTTING TOOLS
Filed Oct. 23, 1936   2 Sheets-Sheet 1
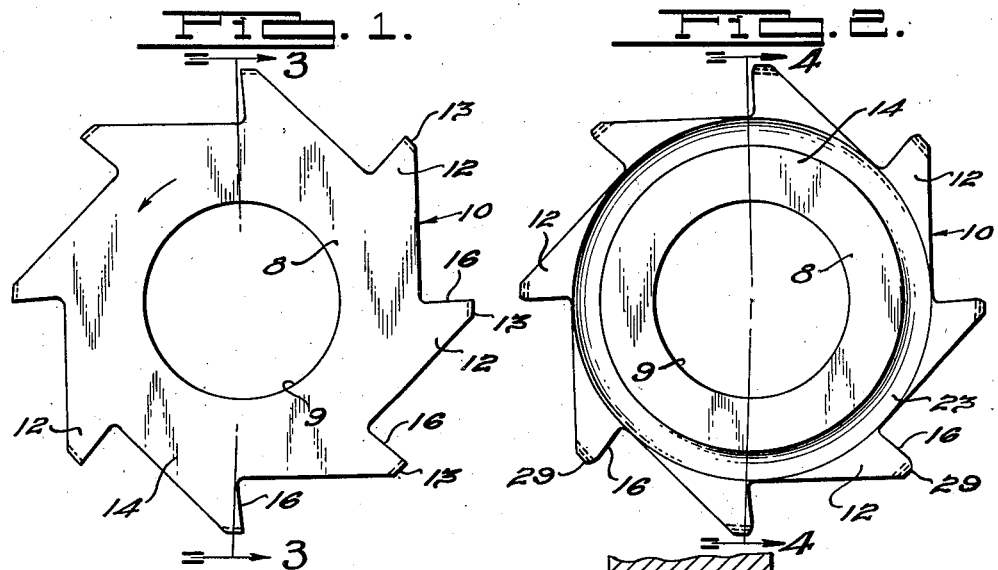
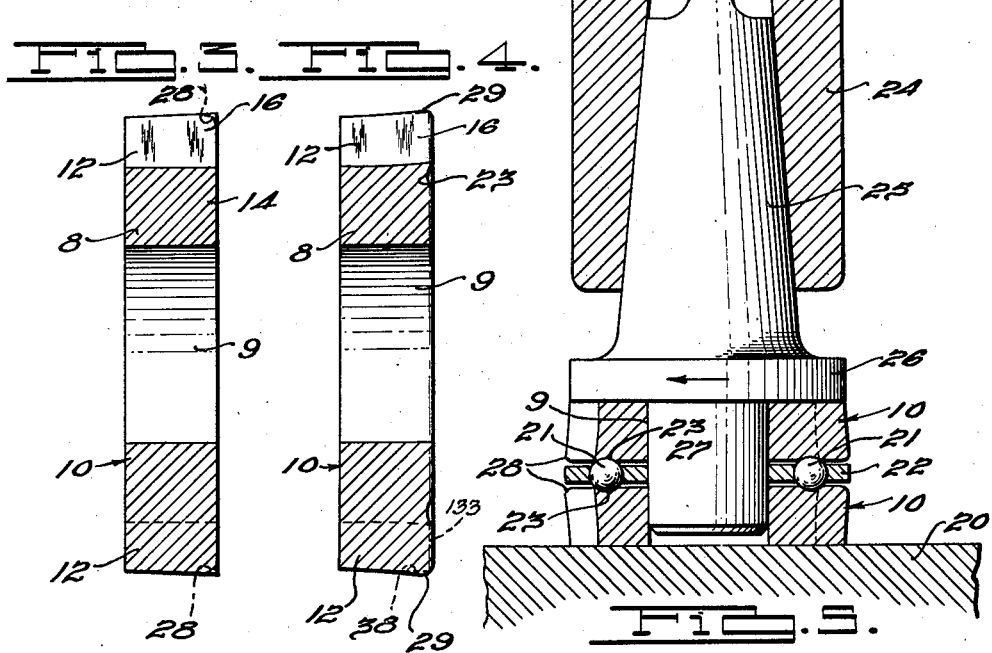
INVENTOR.
John M. Christman.
BY
Tibbetts & Hart
ATTORNEYS.

July 4, 1939.   J. M. CHRISTMAN   2,164,569
METHOD OF LOCATING THE TEETH OF ROTARY CUTTING TOOLS
Filed Oct. 23, 1936   2 Sheets—Sheet 2
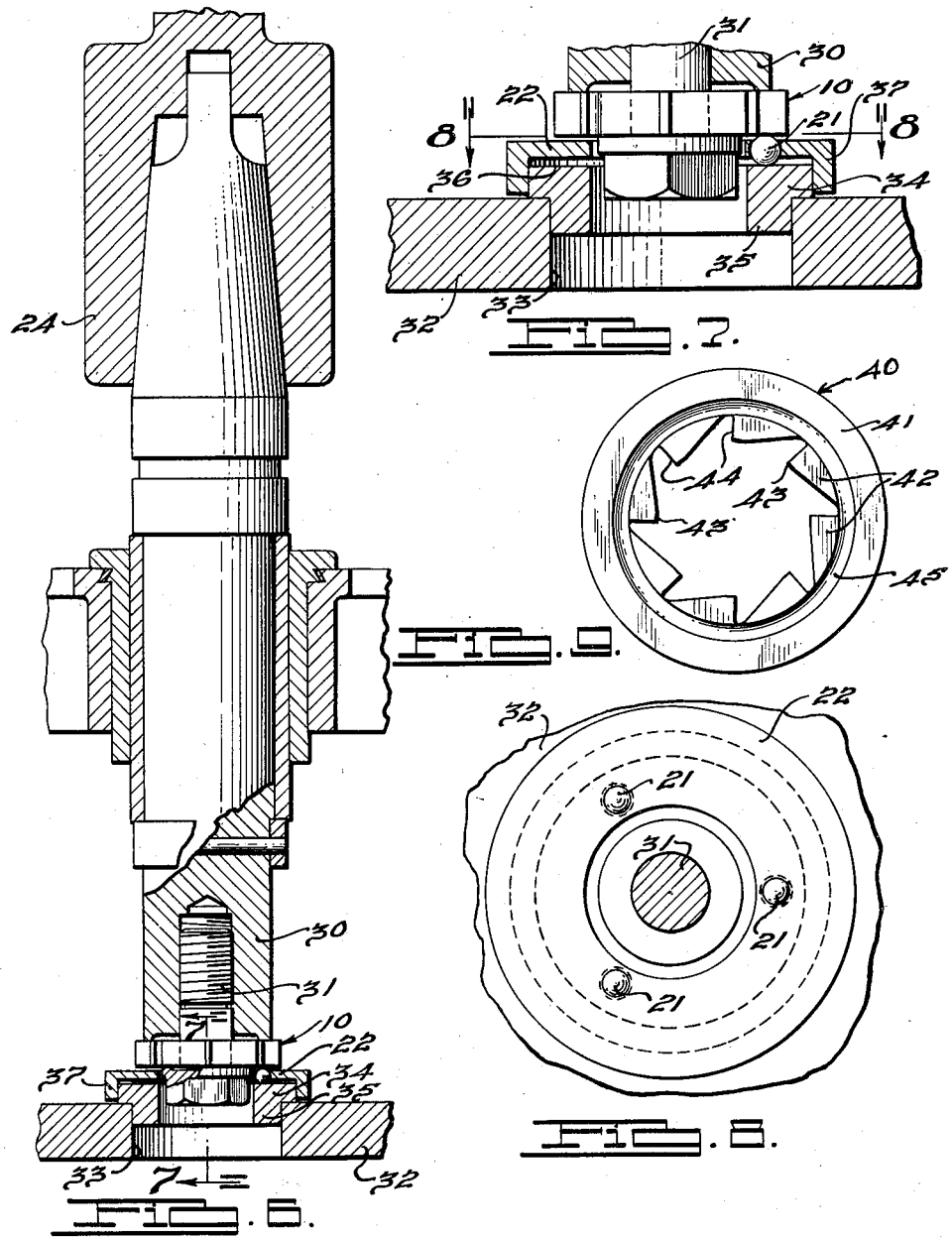
INVENTOR
John M. Christman.
BY Tibbetts & Hart
ATTORNEYS.

Patented July 4, 1939

2,164,569

UNITED STATES PATENT OFFICE 2,164,569

METHOD OF LOCATING THE TEETH OF ROTARY CUTTING TOOLS

John M. Christman, Detroit, Mich., assignor to Packard Motor Car Company, Detroit, Mich., a corporation of Michigan Application October 23, 1936, Serial No. 107,172

2 Claims. (Cl. 76—89.2)

This invention relates to the method of locating the teeth of rotary cutting tools.

In some forms of rotary cutting tools the teeth extend in an axial direction and are formed at one end with a cutting edge arranged normal to the tool axis. These teeth may extend either exteriorly or interiorly from the tool body portion. By rotating such tools and at the same time advancing them in an axial direction, while engaging work, a cutting operation is effected. When peripheral teeth are employed, the tool is useful for reaming bores in work and when internal teeth are employed the tool is useful for reducing the diameter of work.

With either form of tool, the cutting ends of the cutting edges of the teeth must lie in a circle having a diameter corresponding to that at which a piece of work is to be finished. It is necessary therefore that the cutting edges of the teeth be located in a specific position and maintained in such position because otherwise the tool will be useless for a desired requirement.

It is an object of this invention to provide a method for quickly and accurately locating the teeth of a rotary cutting tool, of the type referred to, so that the land ends of the cutting edges of the teeth will lie in a circle of desired diameter.

A further object of the invention is to provide a method for quickly shifting the position of the cutting ends of the teeth of a rotary cutter by a deforming operation.

Other objects of the invention will appear from the following description taken in connection with the drawings, which form a part of this specification, and in which:

Fig. 1 is an enlarged view looking at the cutting face of a disk type of rotary cutting tool conditioned for operation upon a piece of work;

Fig. 2 is a similar view of the tool shown in Fig. 1 when it has been worn by use and after a reforming operation has been performed thereon;

Fig. 3 is a sectional view of the tool taken on line 3—3 of Fig. 1, and showing in dotted lines the outline of the cutting edges of the teeth when worn by use;

Fig. 4 is a sectional view of the tool taken on line 4—4 of Fig. 2, and showing in dotted lines the final form the tool teeth take after refinishing operations;

Fig. 5 is a sectional view of apparatus shown in the operation of enlarging the diameter of the tool;

Fig. 6 is a sectional view of another form of apparatus shown in the operation of enlarging the diameter of a tool while held in cutting position;

Fig. 7 is a sectional view taken on line 7—7 of Fig. 6;

Fig. 8 is a sectional view taken on line 8—8 of Fig. 7;

Fig. 9 is a view looking at the cutting face of a modified form of cutting tool, this view being similar to Fig. 2 in that it shows the tool after the locating operation changing the diameter of the circle defined by the land ends of the cutting edges of the teeth.

As previously related, this invention has to do with relocating the cutting ends of the teeth of rotary cutting tools. Two forms of rotary cutting tools are shown in the drawings, but it is to be understood that the invention also applies to other forms of cutting tools.

The tool, indicated generally by the numeral 10, shown in Figs. 1 to 7 inclusive, is a reamer type and forms the subject matter of my Patent No. 2,087,231, issued July 20, 1937. This cutting tool comprises a body 8 having an axially extending bore 9 and a plurality of similar peripheral teeth 12 extending the entire axial length thereof. These teeth are formed substantially uniform in cross section throughout their length and their peripheral faces 13, or lands, are ground or otherwise finished to lie in a circle, taken on any cross section, struck from the axis of the tool. These peripheral faces of the teeth are shown with a slight back taper starting from the cutting face 14 of the tool, the degree of back taper as shown in the drawings being exaggerated, or the peripheral faces of the teeth can be formed without back taper. The cutting face 14 of the tool is preferably ground normal to the tool axis and the junctions thus formed by the end faces of the teeth and the leading sides 16 thereof provide cutting edges, the peripheral ends of which are defined by the land faces which lie in a circle struck from the tool axis. Such cutting edges are particularly adapted for reaming a bore in a piece of work. In Figs. 1 and 3, the outline of the teeth shown in full lines illustrates their form when located for a boring operation and in Fig. 3 the dotted lines 28 indicate the outline of the cutting edges of the teeth after they have become worn by use.

The tool indicated generally by the numeral 40, shown in Fig. 9, is another type of rotary cutting tool to which the invention applies, such tool forming the subject matter of my application Ser. No. 110,827 filed November 14, 1936. In this form of tool there is a body portion 41 having a bore extending axially therethrough and internal teeth 42 extending in an axial direction the entire length thereof. The teeth of this tool are formed similar to the teeth of the tool previously described and they are particularly adapted for use in reducing the diameter of a piece of work. The land faces 43 of these teeth are preferably ground, or otherwise finished, to lie in a circle struck from the axis of the tool and the cutting edges 44 are formed by the junctions of the ends of the leading sides of the teeth and the side or cutting face thereof. The innermost portion of the cutting edges of such teeth lie in a circle which defines the diameter of the work after they have finished operating thereon. The cutting edges of these teeth will become worn in use in a similar manner to that shown at 30 in Fig. 3.

When the cutting edges of the teeth become worn, the tool can be refinished by grinding away the cutting face in an axial direction until the worn portions are entirely removed so that the cutting edges will again be substantially in the same form as they originally were. Sometimes the land end portions of the teeth are only slightly worn and there are times when the land ends of the cutting edges, although not worn, define a circle of slightly more or less diameter than the diameter of a desired finished surface. By means of the method and apparatus which will now be described, I am able to locate the teeth of rotary tools so that the diameter of the circle in which the land ends of the cutting edges of the teeth lie can be quickly and accurately shifted into desired position. In many instances such locating of the tool teeth will be sufficient to permit further use of the tool, and in other instances, it may be necessary to grind the lands and/or the land and cutting end of the teeth after the locating operation so that they will be positioned as required for a given job.

Cutting tools can be conditioned by this method either when removed from operating position as shown in Fig. 5 or while held in boring position as shown in Figs. 6 to 8 inclusive. In carrying out the invention I prefer to employ balls which are rolled in a circle around the cutting face 14 of the boring tool adjacent the bases of the teeth with pressure applied thereagainst to form a groove 23. Such operation displaces the cutting ends of the teeth radially a similar extent, as indicated at 29 in Figs. 2 and 4.

In Fig. 5, the boring tool is placed flat on a fixed base member 20 with the cutting face uppermost. Balls 21, arranged in a circular relation in a cage 22, are placed on the face 14, and the circle defined by the balls is preferably slightly within the base circle of the teeth. Another boring tool 10 is placed on the balls in alignment with the tool on the base 20, with its cutting face engaging the balls. A pilot 27, extending from the head 26 of a pressure member shank 25, is projected through the bore 9 of the uppermost tool and the cage bore and into the bore 9 of the lower tool. The shank of the pressure member is rotated by member 24, driven in a conventional manner. The head 26 frictionally engages the upper face of the upper tool to apply axial pressure and to rotate the same. In this manner the balls are rolled around the two cutting faces of the two tools and the applied axial pressure forms the circular grooves 23 and thus moves the cutting ends of the teeth radially outward uniformly.

Sometimes the cutting edges of the teeth of the reamer are worn so little that after this tooth locating operation the reamer is suitable for further work. There are occasions when this locating operation can be employed with conditioned reamers to bring the land ends of their cutting edges into a circular relationship of required diameter. When the cutting edges of the teeth are dull or the locating operation has been severe enough to place the peripheral faces 13 out of circular relation, grinding is required. Sometimes a surface grinding of the face 14 to the point shown by dotted line 133 in Fig. 4 is all that is required to properly locate the relocated cutting ends of the teeth. Sometimes a peripheral grinding operation on the relocated cutting ends of the teeth to bring their faces into a circle of desired diameter, as indicated at 38 in Fig. 4, is all that is required. Both of these grinding operations may be required, but they can be quickly done at low cost.

In Figs. 6 to 8 inclusive, the reamer 10 is being conditioned while fixed to its holder in cutting position, this being possible when only a slight increase in diameter of the circle defined by the land ends of the cutting edges of the teeth is required. In this instance the tool is fixed upon the lower end of a holder 30 by bolt 31, the holder being suitably guided and driven as set forth in my previously mentioned application for patent. Work to be operated upon (not shown) is suitably clamped upon the base 32 in which there is an opening 33 to accommodate the tool in its cutting operation. When the diameter of its cutting face 14 of a tool is slightly undersized, the work can be removed from the base and a hardened adapter 34 substituted therefor. The pilot portion 35 of the adapter is inserted into the opening 33 in the base while the upper face 36 serves as a bearing surface for the balls 21 carried by cage 22, the cage in this instance having a peripheral flange 37 telescoping the adapter for the purpose of piloting the cage relative to the reamer. The tool is operated, just as in a cutting operation, and the cutting face 14 will be rotated and moved axially toward and against the balls 21 until distortion caused thereby moves the cutting end of the teeth radially outwardly to locate them in a circle of desired diameter. This operation can often be employed to continue the usefulness of tools after they would otherwise have to be detached from the holder and sharpened or discarded.

In relocating the cutting edges of the tool shown in Fig. 9, the same operations can be followed as described in connection with the tool shown in Figs. 1 to 7 inclusive. The balls under pressure axially of the tool will be rolled around the cutting face adjacent the bases of the teeth forming a groove 45 and moving the teeth radially inward the desired distance. If desired, the land faces of these teeth can then be ground to lie in a circle of greater diameter and the cutting face of the tool can be surface ground to sharpen the cutting edges. Any suitable equipment of the character previously described can be used while relocating the cutting edges.

The herein described manner of locating the teeth of cutting tools can be accomplished at relatively low cost and will materially lengthen their operating life.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. The method of changing the radial position of the cutting faces of a series of cutting teeth of a rotary cutter comprising rolling a plurality of balls in a circular path concentric with the axis of the cutter and against the face of the cutter adjacent the base of the teeth and with pressure axially of the cutter sufficient to move the cutting faces of the teeth bodily in a radial direction.

2. The method of changing the radial position of the cutting faces of a series of cutting teeth of a rotary cutter comprising rolling a plurality of balls in a circular path concentric with the axis of the cutter and against the face of the cutter adjacent the base of the teeth and with pressure applied against the tool in an axial direction sufficient to move the cutting faces of the teeth bodily in a radial direction.

JOHN M. CHRISTMAN.